Figure 1:
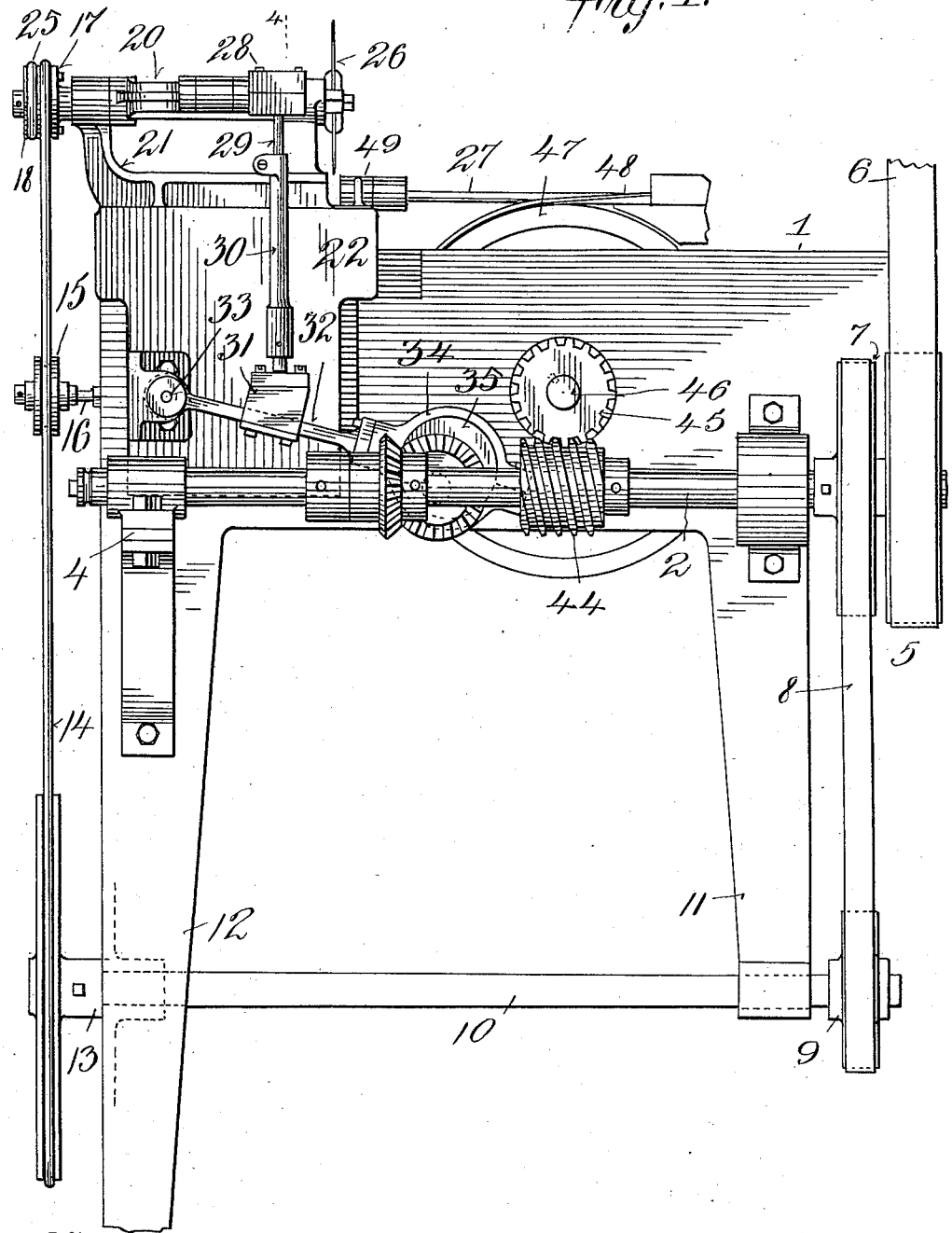

D. HEMMING.
CIGARETTE ROD SEVERING DEVICE.
APPLICATION FILED JUNE 24, 1911.

1,066,012.

Patented July 1, 1913.

2 SHEETS—SHEET 1.

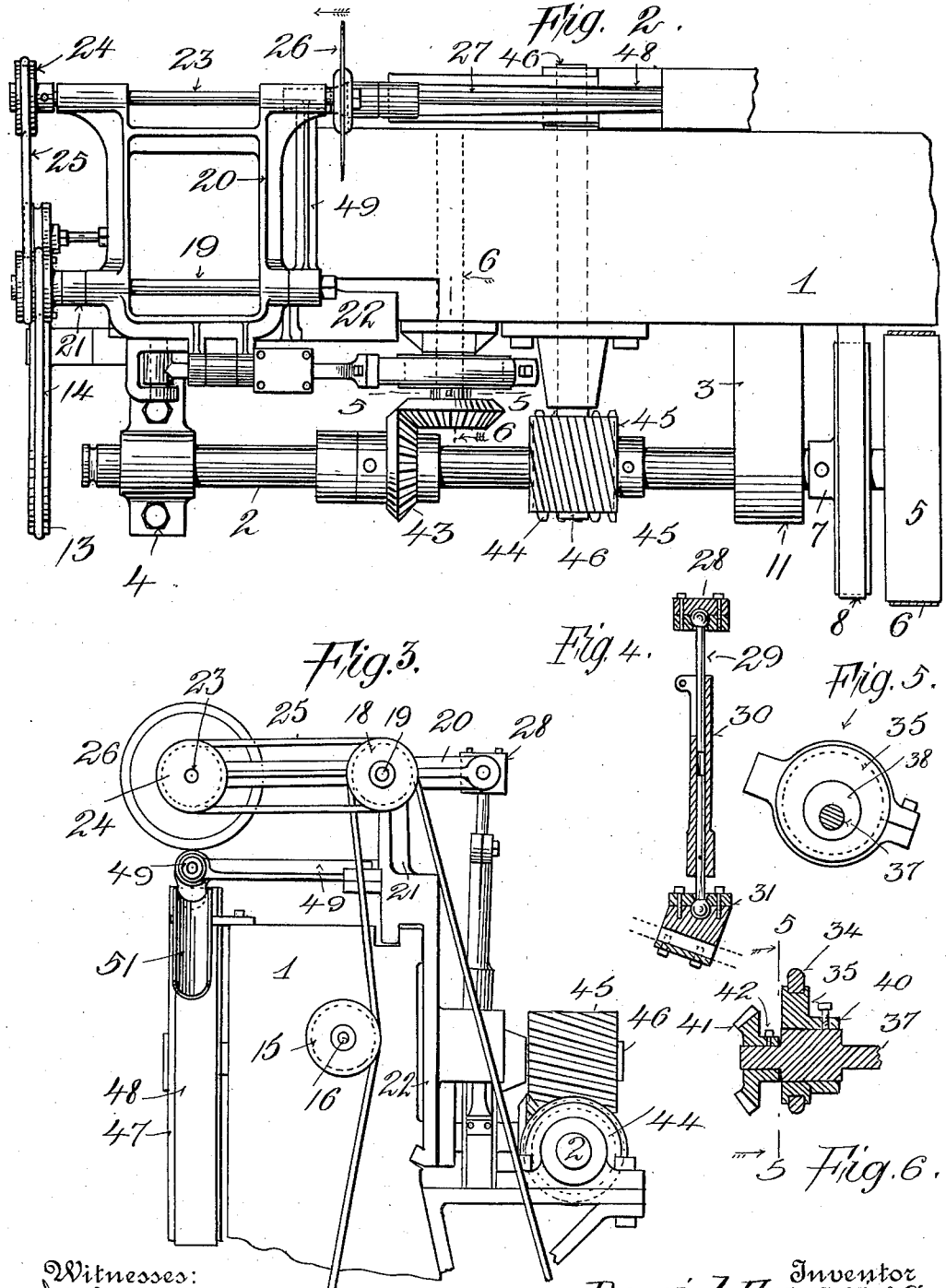

UNITED STATES PATENT OFFICE.

DANIEL HEMMING, OF NEW HAVEN, CONNECTICUT, ASSIGNOR TO THE NEW YORK CIGARETTE MACHINE COMPANY, OF NEW YORK, N. Y., A CORPORATION OF NEW YORK.

CIGARETTE-ROD-SEVERING DEVICE.

1,066,012.   Specification of Letters Patent.   Patented July 1, 1913.

Application filed June 24, 1911. Serial No. 635,152.

*To all whom it may concern:*

Be it known that I, DANIEL HEMMING, a citizen of the United States, and a resident of the city of New Haven, county of New Haven, and State of Connecticut, (whose post-office address is 55 Mechanic street, in said city,) have invented a new and useful Improvement in Cigarette-Rod-Severing Devices, of which the following is a specification.

The object of my invention is to provide a cigarette machine of the continuous rod type with a severing device which will sever the rod at periodical intervals thereby making cigarettes of a predetermined length, and at the same time will move with the rod so as not to interfere with its even movement through the machine.

For a more particular description of my invention reference is to be had to the accompanying drawings forming a part hereof in which—

Figure 1 is a side elevation of a portion of a machine provided with my improvement. Fig. 2 is a plan view of the same. Fig. 3 is an end elevation of a portion of this device. Figs. 4, 5 and 6 show the details of construction, Fig. 4 being taken on the line 4—4 of Fig. 1, Fig. 5 on the line 5—5 of Fig. 6, and Fig. 6 is a sectional view taken on the line 6—6 of Fig. 2, all these sectional views being taken as indicated by the arrows.

Throughout the various views of the drawings, similar reference characters designate similar parts.

My improvement is applied to a cigarette machine 1 of the conventional form, which is driven by the main shaft 2 mounted in suitable bearings 3 and 4, and driven by a pulley 5 which has a belt 6 running thereon, all of which have the usual construction. Close to the pulley 5 is a pulley 7 on which is a belt 8 that runs to a smaller pulley 9 on a shaft 10 suitably journaled at one end in a bracket 11, and at the other end in a bearing near the post or support 12. This end of the shaft 10 is provided with a suitable pulley 13 which carries a belt 14 over an idle pulley 15 mounted on a stud 16 extending from the frame of the machine 1, and the upper part of the belt 14 runs over a pulley 17 adjacent and secured to another pulley 18 and both these pulleys are mounted on a suitable shaft 19 on which a movable frame 20 is also mounted, the shaft 19 being supported from the machine 1 by suitable supports 21. The supports 21 are mounted on a cross-head 22 which is adapted to slide in the direction of the length of the machine, as will appear below. This movement is not great but it is sufficient to enable the severing device to perform its proper function.

The frame 20 has a shaft 23 parallel to the shaft 19 and on this shaft is fixed a pulley 24 by which this shaft is driven from the belt 25 which runs over the pulley 18 and is driven thereby. At the other end of the shaft 23 is a rotary disk 26 with a keen, cutting edge and this disk 26 revolves at a very high speed so as to sever the cigarette rod 27 with precision and celerity. The frame 20 oscillates about the shaft 19 because this frame has a projection 28 which has a ball and socket joint with a rod 29 which may be extended or shortened because its middle part has a sleeve 30 which clamps or holds the ends, and the lower end of this rod 29 is formed with a ball so as to engage a corresponding socket 31 mounted on a pitman 32, which is pivoted at 33 to the slide 22, and the other end of this pitman 32 is provided with a strap 34 on an eccentric 35 which is mounted on a shaft 37 through an enlargement 38 which is also eccentric to the shaft 37 so that by turning the eccentric 38 in the eccentric 35, a very large latitude of adjustment is possible. The eccentric 35 is provided with a laterally extending sleeve 39 with an enlarged opening to receive the shaft 37 and is held in place by means of a set screw 40, or by other suitable means. The shaft 37 is driven by a bevel gear 41 fixed by a set screw 42, or other suitable means, on this shaft 37, and this bevel gear 41 is driven by another bevel gear 43 fixed to the main shaft 2 of the machine. By lengthening or shortening the rod 27 the movement of the cutting disk is determined so that cutters of different diameters may be provided for. By shifting the block 31 on the pitman 32, the length of the transverse movement of the cutting disk can be regulated.

A worm 44 on the shaft 2 drives a corresponding worm gear 45 on a transverse shaft 46 and the other end of this shaft 46 carries the usual pulley 47 on which the belt 48 runs in the conventional manner.

This belt 48 is the one which surrounds the cigarette rod 27 during its process of formation.

In view of the foregoing, the operation of my improved device will be readily understood. Assuming that the rotation of the shaft 46 drives the belt 48 through the pulley 47 so that the cigarette rod 27 is fed continuously to the rotating disk 26, it is severed by the disk 26 while it is driven at a high rate of speed, as above described, and is caused to oscillate about the shaft 19 during the rearward movement of the frame 20 in unison with the cigarette rod 27, and upon severing the rod 27 the disk 26 is raised so as to be clear of the rod on its forward movement when it is ready to sever again. The forward and backward movement of the carriage 22 is given by the eccentric 35 and its pitman 32 causing the oscillating movement of the carriage 20 through the rod 29 with its universal joint so that the pitman not only causes the forward and back movement of the carriage 22 but also an oscillating movement of the frame 20. While the cigarette rod 27 is being severed it is preferably passed through a suitable guide 49 on the cross-head 22, and the severed portion of the rod falls on a suitable chute 50 from whence it passes to the usual storage receptacle.

While I have shown and described one embodiment of my invention, it is obvious that it is not restricted thereto, but is broad enough to cover all structures that come within the scope of the annexed claims.

What I claim is:—

1. In a machine of the class described, a rotary disk mounted on a shaft and means for rotating the shaft, a reciprocating carriage supporting a frame, and a pitman connected with said carriage and said frame so as to cause simultaneous reciprocation and oscillation, and means for driving said pitman.

2. In a machine of the class described, a carriage and means for mounting the same, a frame mounted to oscillate on said carriage, a pitman adapted to reciprocate said carriage, and means for driving said pitman, and means for connecting said pitman with said oscillating frame whereby the frame is oscillated simultaneously with the reciprocation of the carriage.

3. In a machine of the class described, a carriage, means for mounting the same, a frame mounted to oscillate on said carriage, an eccentric, and a link connecting said carriage and eccentric whereby the carriage is oscillated, and a second link connecting said frame and link whereby the frame is oscillated simultaneously with the reciprocation of the carriage.

4. In a machine of the class described, a carriage, means for mounting the same, a frame mounted on said carriage so as to be capable of oscillation, a socket, a pitman on which said socket is mounted, a link connecting said frame and socket, an eccentric and a strap connecting said eccentric and pitman so that one eccentric simultaneously reciprocates the carriage and oscillates the frame.

5. In a machine of the type described, a frame having a projection, a rod with a ball and socket joint between said rod and projection, a sleeve on said rod holding the end thereof, a socket engaging a ball on the lower end of said rod, a pitman on which said socket is mounted, a slide with which said pitman is pivotally connected, a carriage on which said frame is mounted for oscillation and means for simultaneously reciprocating the carriage and oscillating the frame.

Signed at the city, county and State of New York, this 22nd day of June, 1911.

DANIEL HEMMING.

Witnesses:
PAUL A. DRUCKLIEB,
GUSTAVE I. ARNOW.

Copies of this patent may be obtained for five cents each, by addressing the "Commissioner of Patents, Washington, D. C."